US008000576B2

(12) United States Patent
Chen et al.

(10) Patent No.: US 8,000,576 B2
(45) Date of Patent: *Aug. 16, 2011

(54) DOUBLE-CLAD OPTICAL FIBERS AND DEVICES WITH DOUBLE-CLAD OPTICAL FIBERS

(75) Inventors: Xin Chen, Corning, NY (US); Joohyun Koh, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/487,753

(22) Filed: Jun. 19, 2009

(65) Prior Publication Data

US 2010/0021114 A1    Jan. 28, 2010

Related U.S. Application Data

(63) Continuation-in-part of application No. 12/179,086, filed on Jul. 24, 2008, now Pat. No. 7,590,324.

(51) Int. Cl.
G02B 6/02 (2006.01)
(52) U.S. Cl. ............................................... 385/128
(58) Field of Classification Search .................. 385/128
See application file for complete search history.

(56) References Cited

U.S. PATENT DOCUMENTS

2007/0213618 A1    9/2007    Li et al. ..................... 600/476

OTHER PUBLICATIONS

Myaing, Mon Thiri, et al. "Fiber-optic scanning two-photon fluorescence endoscope", Optics Letters, vol. 31, No. 8, Apr. 15, 2006, pp. 1076-1078.
Fu, Ling, et al. "Nonlinear optical microscopy based on double-clad photonic crystal fibers", Optics Express, vol. 13, No. 14, Jul. 11, 2005, pp. 5528-5534.
Fu, Ling, et al. "Nonlinear optical endoscopy based on a double-clad photonic crystal fiber and a MEMS mirror", Optics Express, vol. 14, No. 3, Feb. 6, 2006, pp. 1027-1032.
Jeunhomme, Luc B., "Principles and Applications", Single-Mode Fiber Optics, Second Edition, 1990, pp. 39-44.
U.S. Appl. No. 12/151,170, filed May 5, 2008, "Microstructured Optical Fibers and Methods".
Liu, Anping, et al. "Propagation losses of pump light in rectangular double-clad fibers", Optical Engineering, vol. 35, No. 11, Nov. 1996, pp. 3130-3134.

*Primary Examiner* — Eric Wong
(74) *Attorney, Agent, or Firm* — Robert L. Carlson; Svetlana Z. Short (57) ABSTRACT

A double-clad optical fiber includes a core, an inner cladding and an outer cladding of silica-based glass. The core may have a radius of less than about 5 μm, a first index of refraction $n_1$ and does not contain any active rare-earth dopants. The inner cladding may surround the core and includes a radial thickness of at least about 25 μm, a numerical aperture of at least about 0.25, and a second index of refraction $n_2$ such that $n_2 < n_1$. The relative refractive index percent (Δ%) of the core relative to the inner cladding may be greater than about 0.1%. The outer cladding may surround the inner cladding and include a radial thickness from about 10 μm to about 50 μm and a third index of refraction $n_3$ such that $n_3 < n_2$. The relative refractive index percent (Δ%) of the inner cladding relative to the outer cladding may be greater than about 1.5%.

30 Claims, 4 Drawing Sheets

INDEX OF REFRACTION PROFILE

FIG. 1A

INDEX OF REFRACTION PROFILE

DOUBLE-CLAD OPTICAL FIBERS AND DEVICES WITH DOUBLE-CLAD OPTICAL FIBERS

This application is a Continuation-in-Part and claims the benefit of priority to U.S. patent application Ser. No. 12/179,086, filed on Jul. 24, 2008 now U.S. Pat. No. 7,590,324, the content of which is relied upon and incorporated herein by reference in its entirety.

BACKGROUND OF THE INVENTION

1. Field of the Invention

The present invention relates to double-clad optical fibers and devices utilizing double-clad optical fibers and, more specifically, to double-clad optical fibers having an inner cladding with a high numerical aperture and endoscopes utilizing such double-clad optical fibers.

2. Technical Background

Endoscopes, specifically non-linear optical endoscopes utilizing two-photon fluorescence processes have emerged as one of the best, non-invasive means of performing fluorescence microscopy on a sample and/or a subject. The non-linear optical endoscopes utilize a source or excitation laser beam directed onto a target with an optical fiber. The interaction of the excitation laser beam with the target causes the target material to fluoresce or emit light due to two photon absorption, which is collected back into the endoscope with the optical fiber for further analysis, imaging, spectroscopy and the like. Compared with single-photon microscopy, two-photon fluorescence microscopy offers inherent optical sectioning properties, greater penetration depths and flexible optical spectra accessibility.

One of the key components of non-linear optical endoscopy utilizing the two-photon fluorescence process is the optical fiber employed in the endoscope. While standard single mode optical fiber may be utilized in the endoscope to deliver the excitation laser beam to the target of interest, these optical fibers are not suitable for collecting the optical signals emitted by the target back into endoscope for further analysis, image formation, spectroscopy and the like. This is primarily due to the low numerical aperture and small core size of standard single mode fibers which limits the collection efficiency of the optical fibers.

To improve the collection efficiency of the non-linear optical endoscope, double-clad optical fibers may be used. Such optical fibers generally include a core, an inner cladding, and an outer cladding. The excitation beam of the endoscope is delivered to the target via the core of the optical fiber and the light emitted from the target is collect back into the endoscope via the inner cladding of the optical fiber. However, the collection efficiency of most standard double-clad optical fibers is still low due to the low numeric aperture of the inner cladding. Development of double-clad optical fibers having inner claddings with greater numerical apertures, such as photonic crystal double-clad optical fibers has been developed. However, the photonic crystal double-clad optical fibers are generally more difficult to manufacture than standard optical fibers and, as a result, expensive.

Accordingly a need exists for alternative double-clad optical fibers and non-linear optical endoscopes employing the same.

SUMMARY OF THE INVENTION

In one embodiment, a double-clad optical fiber includes a core, an inner cladding and an outer cladding of silica-based glass. The core may have a radius of less than about 5 µm, a first index of refraction $n_1$ and does not contain any active rare-earth dopants. The inner cladding may surround the core and includes a radial thickness of at least about 25 µm, a numerical aperture of at least about 0.25, and a second index of refraction $n_2$ such that $n_2 < n_1$. The relative refractive index percent ($\Delta\%$) of the core relative to the inner cladding may be greater than about 0.1%. The outer cladding may surround the inner cladding and include a radial thickness from about 10 µm to about 50 µm and a third index of refraction $n_3$ such that $n_3 < n_2$. The relative refractive index percent ($\Delta\%$) of the inner cladding relative to the outer cladding may be greater than about 1.5%.

In another embodiment, a non-linear optical endoscope may include a laser source, a double-clad optical fiber, a beam scanning unit, an optical detector and a computer. The double-clad optical fiber may include a core, an inner cladding and an outer cladding. The core may have a radius of less than about 5 µm, a first index of refraction $n_1$ and does not contain any active rare-earth dopants. The inner cladding may surround the core and includes a radial thickness of at least about 25 µm, a numerical aperture of at least about 0.25, and a second index of refraction $n_2$ such that $n_2 < n_1$. The relative refractive index percent ($\Delta\%$) of the core relative to the inner cladding may be greater than about 0.1%. The outer cladding may surround the inner cladding and include a radial thickness from about 10 µm to about 50 µm and a third index of refraction $n_3$ such that $n_3 < n_2$. The relative refractive index percent ($\Delta\%$) of the inner cladding relative to the outer cladding may be greater than about 1.5%. An output of the laser source may be optically coupled to the core of the double-clad optical fiber at a first end of the double-clad optical fiber such that the output of the laser source is directed into the core of the double-clad optical fiber. The optical detector may be coupled to the inner cladding of the double-clad optical fiber at the first end of the double-clad optical fiber and may be operable to convert light traveling through the inner cladding into electrical signals. The computer may be electrically coupled to the optical detector and operable to form an image from electrical signals received by the optical detector. The beam scanning unit may be optically coupled to a second end of the optical fiber and may be operable to scan the output of the laser source directed into the core of the double-clad optical fiber across a target in two dimensions and collect light emitted from the target into the inner cladding of the double-clad optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

DETAILED DESCRIPTION OF THE PREFERRED EMBODIMENTS

The following definitions and terminology are used herein:

Refractive index profile is the relationship between the relative refractive index ($\Delta\%$) and the radius of the optical fiber, as measured from the centerline of the optical fiber, over a selected portion of the fiber;

Relative refractive index percent or delta percent ($\Delta\%$) is defined as:

$$\Delta\% = 100 \frac{(n_i^2 - n_{ref}^2)}{2n_i^2},$$

where $n_i$ is the maximum refractive index in region i, and $n_{ref}$ is the index of refraction of the reference region, unless otherwise specified herein;

Mode field diameter (MFD) is a measure of the spot size or beam width of light propagating in a single mode fiber. Mode-field diameter is function of the source wavelength, fiber core radius and fiber refractive index profile. MFD is measured using the Peterman II method where $$MFD = 2w, \text{ and}$$

$$w^2 = 2\frac{\int_0^\infty E^2 r\, dr}{\int_0^\infty (dE/dr)^2 r\, dr}$$

where E is the electric field distribution in the fiber and r is the radius of the fiber;

Chromatic dispersion or dispersion of a fiber is the sum of the material dispersion, the waveguide dispersion, and the inter-modal dispersion. In the case of single mode waveguide fibers the inter-modal dispersion is zero.

The effective area of a fiber is the area of the fiber in which light is propagated and is defined as:

$$A_{eff} = 2\pi \frac{\left(\int_0^\infty E^2 r\, dr\right)^2}{\int_0^\infty E^4 r\, dr},$$

where E is the electric field associated with light propagated in the fiber and r is the radius of the fiber.

The cutoff wavelength is the minimum wavelength at which an optical fiber will support only one propagating mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The fiber cutoff wavelength will be lower than the theoretical cutoff wavelength and is measured using a transmitted power technique such as the technique described in TIA-455-80B entitled "Measurement Cut-off Wavelength of Uncabled Single-mode Fiber By Transmitted Power. To avoid interference between light propagating in the core region and light propagating in the inner cladding region of the double-clad optical fiber, a launch fiber is used to direct the light source into the core of the double-clad optical fiber. The launch fiber has a cutoff wavelength slightly greater than the expected core fiber cutoff wavelength of the double-clad optical fiber. The length of the launch fiber should be greater than 2 meters. The core size of the launch fiber is approximately the same as the core size of double-clad optical fiber. In the measurement, the launch fiber is carefully aligned to the double-clad fiber to ensure an efficient coupling between the core of the launch fiber and a core of the double-clad optical fiber.

All wavelength-dependent optical properties (such as dispersion, cutoff wavelength, etc.) are reported herein for the wavelength specified.

It should be understood that $\Delta_1\%$, as used herein, refers to the relative refractive index percent ($\Delta\%$) of the core of the double-clad optical fiber relative to the inner cladding of the double-clad optical fiber. Accordingly, $$\Delta_1\% = 100 \frac{(n_1^2 - n_2^2)}{2n_1^2},$$

where $n_1$ is the index of refraction of the core and $n_2$ is the index of refraction of the inner cladding.

It should be understood that $\Delta_2\%$, as used herein, refers to the relative refractive index percent ($\Delta\%$) of the inner cladding of the double-clad optical fiber relative to the outer cladding of the double-clad optical fiber. Accordingly, $$\Delta_2\% = 100\frac{(n_2^2 - n_3^2)}{2n_2^2},$$

where $n_2$ is the index of refraction of the inner cladding and $n_3$ is the index of refraction of the outer cladding.

Figure 1A:
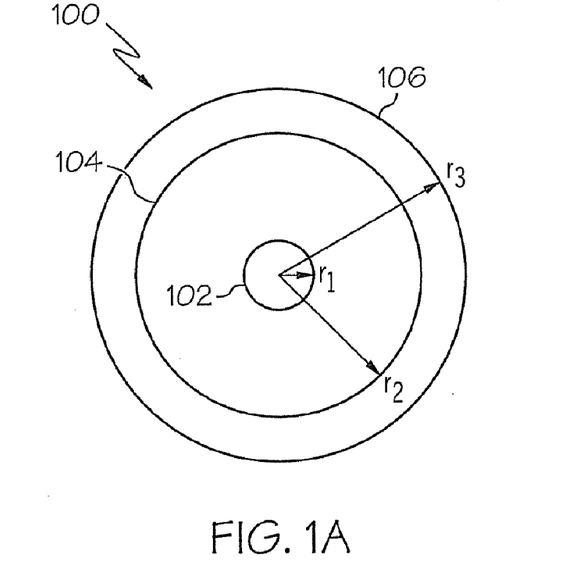
FIG. 1A depicts a cross section of a double-clad optical fiber according to one or more embodiments shown and described herein.

FIG. 1A shows a double-clad optical fiber with an inner cladding having a high numerical aperture according to one embodiment shown and described herein. The double-clad optical fibers described herein generally comprise a core, an inner cladding, and an outer cladding. The material of the outer cladding and the inner cladding are selected such that the indices of refraction of the outer cladding and the inner cladding yield an inner cladding with a high numerical aperture. The core, inner cladding and outer cladding generally comprise silica, specifically silica glass. The structure, composition, methods of manufacture, characteristics and devices utilizing the double-clad optical fibers will be described and discussed in more detail herein.

Figure 1B:
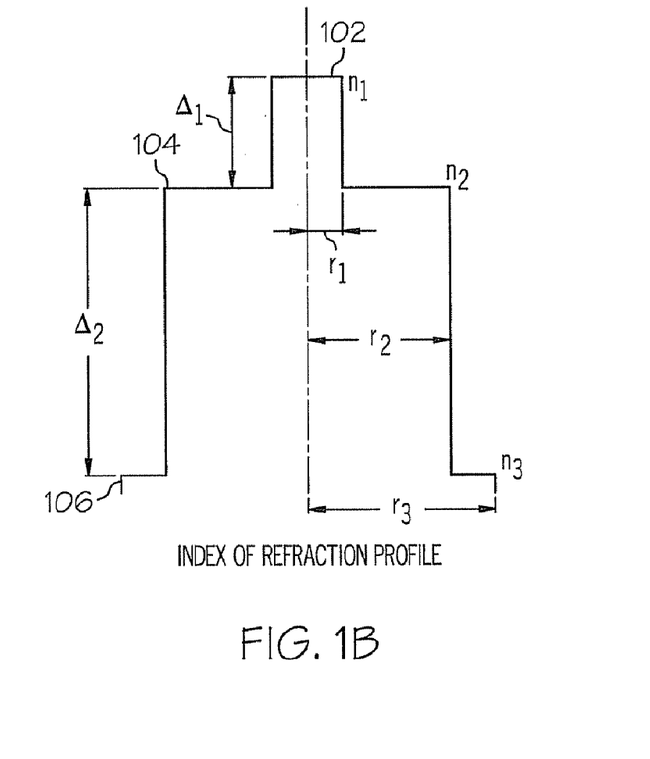
FIG. 1B depicts the refractive index profile of the double-clad optical fiber of FIG. 1A according to one or more embodiments shown and described herein.

Referring now to FIGS. 1A and 1B, a cross section of a double-clad optical fiber 100 and the corresponding refractive index profile is shown according to one embodiment described herein. The double-clad optical fiber 100 generally comprises a core 102, an inner cladding 104 and an outer cladding 106. In the embodiment shown, the core 102, the inner cladding 104 and the outer cladding 106 generally comprise silica, specifically silica glass. In one embodiment (not shown) one or more protective coatings may surround the outer cladding 106. In the embodiments shown herein, the cross section of the double-clad optical fiber may be generally circular-symmetric with respect to the center of the core although it should be understood that the optical fibers and individual layers of the optical fiber (e.g., the core, the inner cladding, and the outer cladding) may have other geometrical configurations. When the double-clad optical fiber is circular-symmetric as shown in FIG. 1, the outer diameter (e.g., $2r_3$) of the double-clad optical fiber 100 may be from about 125 μm to about 500 μm, more preferably 125 μm to about 300 μm and, most preferably, 125 μm to about 250 μm.

In the embodiment shown in FIG. 1, the core 102 may have a first index of refraction $n_1$. The core 102 may comprise pure silica ($SiO_2$) or, alternatively, the core 102 may comprise one or more index of refraction raising dopants such as, for example, $GeO_2$, $Al_2O_3$, $P_2O_5$, $TiO_2$, $ZrO_2$, $Nb_2O_5$ and/or $Ta_2O_5$, such as when the core is "up-doped." In the embodiments and examples discussed herein, the core 102 may contain from about 5.5 wt. % to about 32.5 wt. % $GeO_2$, more preferably about 5.5 wt. % to about 15 wt. % $GeO_2$ and, most preferably, 5.5 wt. % to about 10 wt. % $GeO_2$.

The radius $r_1$ of the core 102 may be from about 1.5 μm to about 5 μm, more preferably from about 2 μm to about 4.5 μm and, most preferably, from about 2.5 μm to about 4 μm such that the spot size of light propagating through the core of the double-clad optical fiber is small with a corresponding high optical power density thereby producing strong non-linear effects if the double clad optical fiber is used in conjunction with a non-linear optical endoscope. However, the spot size should also be large enough for efficient coupling of a light source to the core of the double-clad optical fiber. The effective area of the core 102 of the double-clad optical fiber may be from about 7 μm² to about 80 μm², more preferably from about 13 μm² to about 64 μm² and, most preferably, from about 20 μm² to about 50 μm².

The relative refractive index percent ($\Delta\%$) of the core relative to the inner cladding (e.g., $\Delta_1\%$) may be at least 0.1%, more preferably greater than about 0.2%, and, most preferably, greater than about 0.3%. The numerical aperture NA of the core characterizes the range of angles over which the core may accept or emit an optical signal and is directly related to the refractive indices of the core 102 and the inner cladding 104 (discussed further herein). As used herein, the "numerical aperture of the core" is expressed as:

$$NA_{core} = \sqrt{(n_1^2 - n_2^2)}$$

for a core having an index of refraction $n_1$ and an inner cladding having an index of refraction $n_2$. Unless otherwise stated, any reference to the numerical aperture of the core or $NA_{core}$ refers to the numerical aperture of the core as determined by the above referenced mathematical relation. In embodiments shown and described herein, the material comprising the core 102 and the inner cladding 104 may be selected such that the numerical aperture of the core 102 is preferably from about 0.08 to about 0.2, more preferably about 0.1 to about 0.15 and, most preferably, about 0.12. The refractive index profile of the core may be a step profile, as shown in FIG. 1B, a rounded step, or a gradient profile.

In one embodiment, the core 102 may be passive, e.g., the core 102 does not contain any active elements which would enable a gain or lasing action in the core 102. Specifically, the core 102 may be devoid of any rare earth dopants including Yb, Er, Nd, Tm, Sm and Tb. In certain embodiments phosphorous may be added to the core 102 in order to lower the softening temperature of the silica glass in the core 102. This can be particularly advantageous if the core is produced by an inside vapor deposition (IVD) process. Additions of phosphorous may also be utilized to raise the refractive index of the core 104.

In embodiments shown and described herein, the core of the double-clad optical fiber is single moded at the desired operating wavelength such as, for example, wavelengths of 800 nm, 1060 nm, 1310 nm and 1550 nm. As used herein, single moded means that the double-clad optical fiber only supports one propagating mode for the particular wavelength of light. Single mode fibers generally have better dispersion characteristics (e.g., lower dispersion) than multi-mode fibers. The fiber cutoff wavelength generally delineates the operating wavelengths for which the double-clad optical fiber will be single moded with operating wavelengths greater than the cut-off wavelength being suitable for single mode propagation. Thus, it is desirable that the fiber be designed so that the core fiber cutoff wavelength is less than the operating wavelength at which the fiber is intended to be used, e.g. less than 800, 1060, 1310, and/or 1550 nm.

The inner cladding 104 may have a second index of refraction $n_2$ such that $n_2 < n_1$. The inner cladding 104 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the inner cladding is "up-doped," or silica glass with a dopant which decreases the index of refraction such as fluorine or boron, such as when the inner cladding is "down-doped." In one embodiment, the inner cladding is pure silica glass. In another embodiment, the inner cladding may comprise silica glass doped with $GeO_2$ in an amount from about 5.5 wt. % to about 27 wt. %, more preferably 5.5 wt. % to about 15 wt. % and, most preferably, 5.5 wt. % to about 10 wt. %. In yet another embodiment, the inner cladding may comprise silica glass doped with $Al_2O_3$ from about 1 wt. % to about 15 wt. %, more preferably 1 wt. % to about 10 wt. %, and, most preferably, from about 1 wt. % to about 5 wt. %. It should be understood that the dopant added to the core need not be the same as the dopant added to the inner cladding. For example, the inner cladding may comprise silica glass doped with $GeO_2$ while the core may comprise silica glass doped with $Al_2O_3$. However, if $Al_2O_3$ is used in conjunction with $GeO_2$ in the core, and the operating (i.e., signal) wavelengths are above 850 nm, it is preferable to use less than 2 wt % of $Al_2O_3$ in the core, and more preferable less than 1 wt % of $Al_2O_3$, and even more preferably less than 0.5 wt %, in order to minimize optical scattering in the core, at these wavelengths (i.e., >850 nm).

The thickness of the inner cladding 104 (e.g., $r_2$-$r_1$) may be greater than about 25 μm, more preferably greater than about 30 μm and, most preferably, greater than about 40 μm. The relative refractive index percent (Δ%) of the inner cladding 104 relative to the outer cladding 106 (e.g., $\Delta_2$(%)) is greater than about 1.5% which corresponds to a numerical aperture of at least 0.25. The numerical aperture of the inner cladding characterizes the range of angles over which the inner cladding may accept or emit an optical signal and depends on the mathematical relationship between refractive indices of both the inner cladding and the outer cladding. According to one embodiment, the "numerical aperture of the inner cladding" may be calculated using the relationship:

$$NA_{innercladding} = \sqrt{(n_2^2 - n_3^2)},$$

where $n_2$ is the index of refraction of the inner cladding and $n_3$ is the index of refraction of the outer cladding (discussed further herein). For example, for the fiber examples shown in Tables 2A and 2B, the numerical apertures of the inner claddings were theoretically determined using the mathematical relationship defined above. However, the numerical apertures of the inner claddings of the fiber examples shown in Table 1 were experimentally determined using an apparatus and technique that will be discussed further herein. The relative compositions of the inner cladding 104 and the outer cladding 106 may be selected such that the difference in the refractive indices yields an inner cladding 104 having the desired numerical aperture. The numerical aperture of the inner cladding may be greater than about 0.25, more preferably greater than about 0.3 and, most preferably, greater than about 0.35 to maximize the range of angles over which the inner cladding accepts or emits an optical signal. The refractive index profile of the inner cladding may be a step profile, as shown in FIG. 1B, a rounded step, or a gradient profile.

The thickness of the outer cladding 106 (e.g., $r_3$-$r_2$) may be from about 10 μm to about 50 μm, more preferably about 12.5 μm to about 30 μm and, most preferably, about 15 μm to about 20 μm. The outer cladding may generally have a third index of refraction $n_3$ such that $n_3 < n_2 < n_1$. As noted hereinabove, the material composition of the inner cladding 104 and the outer cladding 106 may be selected such that the differences in the indices of refraction yield the desired numerical aperture for the inner cladding 104. To achieve an inner cladding with the desired numerical aperture of greater than about 0.25, the outer cladding 106 may be down-doped relative to the inner cladding 104 such that the difference between the index of refraction of the outer cladding $n_3$ and the index of refraction of the inner cladding $n_2$ results in the desired numerical aperture for the inner cladding 104. Alternatively, the inner cladding 104 may be up-doped with respect to the outer cladding 106 or the inner cladding 104 may be up-doped with respect to the outer cladding 106 and the outer cladding 106 is down-doped with respect to the inner cladding 104.

In one embodiment, the outer cladding 106 may comprise silica glass with one or more dopants, such as fluorine, boron or combinations thereof, which lower the index of refraction $n_3$ of the outer cladding 106 with respect to the index of refraction $n_2$ of the inner cladding 104 (e.g., the outer cladding 106 is "down-doped"). In one embodiment, the outer cladding 106 may comprise silica glass with less than about 5 wt. % F and less than about 10 wt. % B in the form of $B_2O_3$, more preferably less than about 2.5 wt. % F and less than about 5 wt. % B in the form of $B_2O_3$ and, most preferably, about 2 wt. % F and less than about 5 wt. % B in the form of $B_2O_3$ such that the relative refractive index percent (Δ%) of the inner cladding 104 relative to the outer cladding 106 (e.g., $\Delta_2$%) is greater than about 1.5%. When the inner cladding 104 comprises pure silica glass and the outer cladding 106 comprises silica glass with about 2 wt. % F and about 5 wt. % B, the numerical aperture of the inner cladding may be about 0.30. In another embodiment, when the inner cladding 104 contains dopants (e.g., $GeO_2$, $Al_2O_3$ or the like) that increase the index of refraction of the inner cladding and the outer cladding 106 comprises silica glass with about 2 wt. % F and about 5 wt. % B, the numerical aperture of the inner cladding may be greater than about 0.30.

Figure 2:
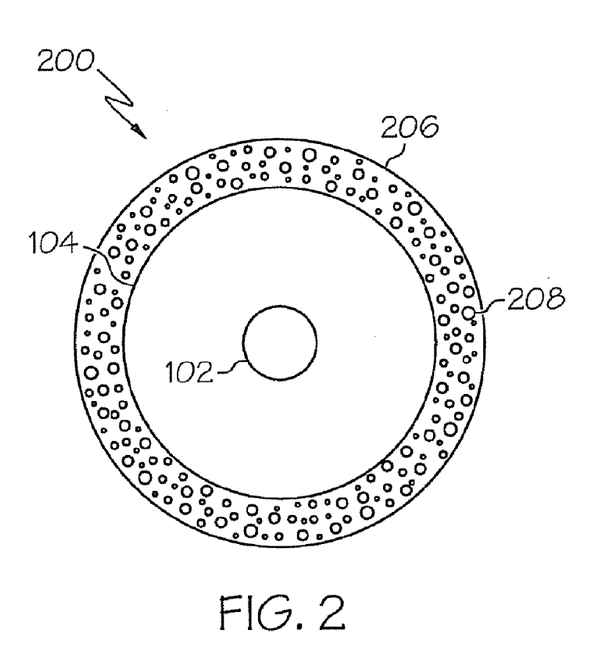
FIG. 2 depicts a cross section of a double-clad optical fiber comprising a random distribution (both size and position) of voids in the outer cladding according to one or more embodiments shown and described herein.
Figure 3:
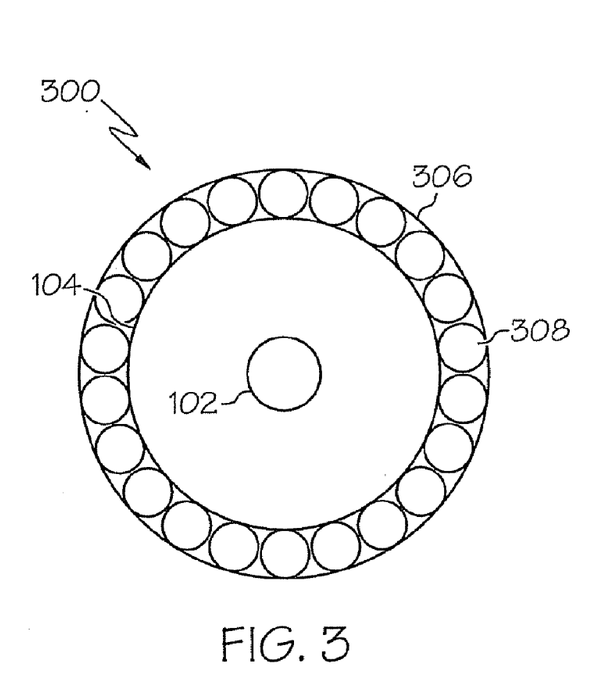
FIG. 3 depicts a cross section of another double-clad optical fiber comprising a regular distribution (both size and position) of voids in the outer cladding according to one or more embodiments shown and described herein.

Alternatively, the index of refraction $n_3$ of the outer cladding 106 may be decreased by forming the outer cladding such that the outer cladding contains a distribution of voids as is shown in FIGS. 2 and 3 which depict two embodiments of double-clad optical fibers 200, 300 with outer claddings containing voids. The voids may contain air and/or consolidation gases such that the index of refraction of the voids is less than the index of refraction of the outer cladding. Accordingly, by incorporating voids in the outer cladding, the index of refraction $n_3$ of the outer cladding relative to the inner cladding may be reduced.

A cross section of a double-clad optical fiber 200 with a void-containing outer cladding 206 is shown in FIG. 2. The void-containing outer cladding 206 comprises a plurality of voids 208 distributed throughout the outer cladding. In one embodiment, the voids may comprise discrete, closed voids formed in the outer cladding when the material of the outer cladding is deposited and consolidated during the manufacture of the optical fiber preform from which the double-clad optical fiber 200 is drawn. The closed voids may contain consolidation gases which become trapped in the voids during the consolidation process. In the embodiment shown, the voids 208 may be small, e.g., the voids may have diameters smaller than the wavelength of light propagated along the inner cladding 104 of the double-clad optical fiber 200. For example, the voids 208 may have diameters of less than about 500 nm, more preferably less than about 300 nm and, most preferably, less than 200 nm. As shown in FIG. 2, the voids may have a random size distribution throughout the outer cladding 206 such that the outer cladding comprises a distribution of voids having different cross sectional areas. When the voids in the outer cladding are small voids, as defined herein, the regional void area percent of the voids may be greater than about 10%, more preferably greater than about 20% and, most preferably greater than 25%. The regional void area percent of the voids may preferably be less than 60%. Regional void area percent, as used herein, means the total area of the voids in a void containing region (e.g., the outer cladding) divided by the total area of the void containing region (when the optical fiber is viewed in cross-section taken perpendicular to the axis of the optical fiber) times 100. In the particular embodiment shown in FIG. 2, the regional void area percent of the outer cladding 206 is on the order of 25%.

In some embodiments, the voids contained in the outer cladding may be either non-periodically disposed, or periodically disposed, or both. "Non-periodically disposed" or "non-periodic distribution," means that, for a particular cross section (such as a cross section perpendicular to the longitudinal axis) of the optical fiber, the non-periodically disposed voids are randomly or non-periodically distributed across the outer cladding. Similar cross sections taken at different points along the length of the fiber will reveal different cross-sectional hole patterns, i.e., various cross sections will have different hole patterns, wherein the distributions of voids and sizes of voids do not match. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. The double-clad optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a void is the longest line segment whose endpoints are disposed on the silica internal surface defining the void when the optical fiber is viewed in perpendicular cross-section transverse to the longitudinal axis of the fiber.

In the embodiment shown in FIG. 2, the inner cladding 104 and core 102 of the double-clad optical fiber 200 may be as described hereinabove with respect to the double-clad optical fiber 100 depicted in FIG. 1. A double-clad optical fiber having an inner cladding comprising pure silica glass and a void-containing outer cladding having a regional void area percent of approximately 25% air may result in the inner cladding having a numerical aperture of about 0.68.

While the voids 208 shown in FIG. 2 have been described herein as closed, non-periodically distributed voids having a random size distribution, it should be understood that the voids 208 may also be periodically distributed throughout the outer cladding and that the voids may also be of a generally uniform size. Further, the voids may also be open and, as a result, contain air as will be described in more detail herein.

Referring now to FIG. 3, another embodiment of a double-clad optical fiber 300 with a void-containing outer cladding 306 is shown. In this embodiment, the voids 308 large, e.g., the voids 308 have diameters larger than the wavelength of light propagated along the inner cladding 104 of the double-clad optical fiber 300. For example, in this embodiment, the large voids 308 may generally have a diameter of greater than 1 µm, more preferably greater than about 5 µm and, most preferably, greater than about 10 µm. When the voids 308 are large, as defined herein, the regional void area percent may be greater than about 80%, more preferably greater than about 90% and, most preferably about 95%. When the voids 308 are large, as defined herein, the regional void area percent may preferably be less than 98%. In the example shown, the regional void area 5 of the outer cladding 306 is on the order of 90% which greatly reduces the overall index of refraction of the outer cladding. When the outer cladding regional void area % is approximately 90% air and the inner cladding comprises pure silica glass the inner cladding may have a numerical aperture of about 1.

In the embodiment shown in FIG. 3, the voids 308 may be periodically distributed throughout the cross section of the outer cladding. The voids 308 may also generally comprise the same diameter. The voids 308 may be open and, as a result, may contain air. The voids 308 may be formed by drilling holes in the outer cladding region of the optical fiber preform from which the double-clad optical fiber is drawn. Alternatively, the large voids 308 may be formed using a "stack and draw" method of forming an optical fiber preform. The drilling and stack and draw methods may be used to produce either small voids (e.g., such as described with respect to FIG. 2) or large voids (e.g., such as is described with respect to FIG. 3). However, it should be understood that other techniques for forming open voids in the outer cladding may be used.

In one embodiment, the double-clad optical fibers of FIGS. 1-3 may be produced by an outside-vapor-deposition (OVD) process. The OVD process is a way of making optical fiber through reactions from specific vapor-phase ingredients (including silica and other dopant precursors) via a hydrolysis process in a $CH_4+O_2$ flame to form silica glass and/or silica glass and dopant soot-particles which are then collected by thermopheretic means onto either a bait rod (for making a core soot-preform) or a glass core cane or rod (for making overclad soot-preform). The soot-preform is subsequently dried and densified into solid glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. In summary, the core and/or cladding preform is generated first, then consolidated, and the final (consolidated) preform is drawn into optical fiber by known fiber-drawing methods.

More specifically, vapor-phase precursor materials that may be used to make the portion of the soot preform associated with the core of the double-clad optical fiber may be, for example, $SiCl_4$, $GeCl_4$, $AlCl_3$, $TiCl_4$, or $POCl_3$. In some embodiments, the core preform comprises pure silica glass or silica glass doped with $GeO_2$. After the soot is consolidated into the core preform, the OVD process is used to deposit $SiO_2$ soot on the consolidated core preform to form a soot preform of the inner cladding of the double-clad optical fiber. As described above, the inner cladding may contain dopants which may increase or decrease the index of refraction of the inner cladding. Such dopants may be deposited with the $SiO_2$ soot. For example, when the inner cladding is up-doped with $GeO_2$, the $GeO_2$ may be deposited with the $SiO_2$ soot. After the soot preform of the inner cladding is deposited on the core preform, the inner cladding soot preform may be consolidated to form a layer of dense silica glass around the core preform. In some embodiments, the core preform comprises pure silica glass without any updopants (and the inner cladding is down-doped relative to $SiO_2$).

After the soot preform of the inner cladding is deposited, the soot preform of the outer cladding may be deposited onto the core preform. In one embodiment, as discussed above, the outer cladding comprises silica glass down-doped with fluorine and boron in the form of $B_2O_3$. Accordingly, to deposit the down-doped silica glass layer, $SiO_2$ or $SiO_2$ down doped with $B_2O_3$ may be deposited on the consolidated soot preform of the inner cladding to form a soot preform of the outer cladding. A gas containing F, for example $SiF_4$, may be used in the consolidation process to lower the refractive index of the cladding portion of the preform. As discussed above, the consolidated glass containing B and/or F has a lower refractive index than pure silica.

If boron/fluorine codoping is employed, boron/fluorine codoping in silica glass may be accomplished via two steps: (i) boron doping in soot deposition; followed by (ii) silica sinter-doping during consolidation.

For example, deposition of the boron-doped $SiO_2$ outer cladding may be performed on a pure silica or up- or down-doped silica inner cladding which surrounds a pure silica or $GeO_2$ doped silica core rod using $BCl_3$ and $SiCl_4$ or B- and Si-containing organometallic precursors, as source materials. It is noted that the capture efficiency of boron in laydown increases as OVD burner flame temperature decreases. The preferred temperature range during the laydown step is about 1400° C. to 1600° C. for the target boron oxide content of the soot of 10 wt % to 12 wt %, and suitable soot density (for example less than 0.6 gm/cm$^3$, more preferably less than 0.5 gm/cm$^3$, and even more preferably less than 0.4 gm/cm$^3$) for easier F sinter-doping at the subsequent consolidation step. Such a boron-doped soot made preform usually has high OH content and high stress level, due respectively to the lower temperature hydrolysis process and higher thermal expansion coefficient of the soot composition. To prevent the likelihood of the soot-preform from cracking, a thermal stabilization step is preferred for the soot-preform prior to its F-sinter doping at consolidation. The soot preform is preferably thermally stabilized at 100° C. to 500° C., for example in a 300° C. holding oven under a dry inert gas atmosphere for about 8 hours. In this regard, thermal stabilization may be 3 to 24 (e.g., 10, 12, 16, or 18 hours), with longer thermal stabilization for larger size soot preforms.

The soot preform according to this exemplary embodiment is then consolidated in the furnace with a F compound, for example with $SiF_4$ or $CF_4$. Fluorine (F) sinter-doping into the boron-containing soot-preform, according to an embodiment of this invention, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which is around 800° C., or lower). The exemplary silica soot preform (doped with 10 wt % B) is first $Cl_2$-dried at around 850° C.-900° C. for 45-60 minutes. The dry-zone temperature is then ramped-up to 1200° C. for sinter/F doping for 90 to 150 minutes with $SiF_4$. During sintering and F doping, the boron composition is consolidated glass drops significantly, such as from 10 wt % in the soot phase to 4-8 wt % in the fully consolidated glass phase. Such a reduction is caused by etch out of boron in the presence of fluorine. As a result, the boron and fluorine concentration in glass may be in the range of 4-8 wt % and 1.5-2.5 wt %, respectively. After the consolidation process, the consolidated preform is cooled down and taken to fiber draw.

In another embodiment, the outer cladding of the double-clad optical fiber may comprise a void-containing outer cladding instead of an outer cladding comprising B and/or F dopants. The voids in the void-containing outer cladding may lower the index of refraction of the outer cladding. In one embodiment, in order to produce the void-containing outer cladding, $SiO_2$ soot may be deposited on the consolidated soot preform of the inner cladding. The $SiO_2$ soot is deposited and consolidated under conditions which are effective to trap a portion of the consolidation gases in the consolidated glass thereby producing an array of closed voids in the outer cladding region of the optical fiber preform from which the double-clad optical fiber is drawn. For example, the outer cladding may be consolidated in a gaseous atmosphere under conditions which cause a portion of the gaseous atmosphere to become trapped in the voids as the voids are closed. The gaseous atmosphere may comprise a gas which lowers the index of refraction, such as nitrogen or krypton. However, it will be understood that other consolidations gases which lower the index of refraction of the glass may be used such as, for example, nitrogen, argon, carbon dioxide, oxygen, $CF_4$, chlorine, CO, $C_2F_6$, $SO_2$, Kr, Xe, Ne and mixtures thereof, but not air. In some embodiments, the method used to create the void-containing outer cladding may be similar to the methods disclosed in U.S. patent application Ser. No. 12/151,170, filed May 5, 2008 and entitled "MICROSTRUCTURED OPTICAL FIBERS AND METHODS", although other methods for forming a void-containing outer cladding may be used.

Figure 4:
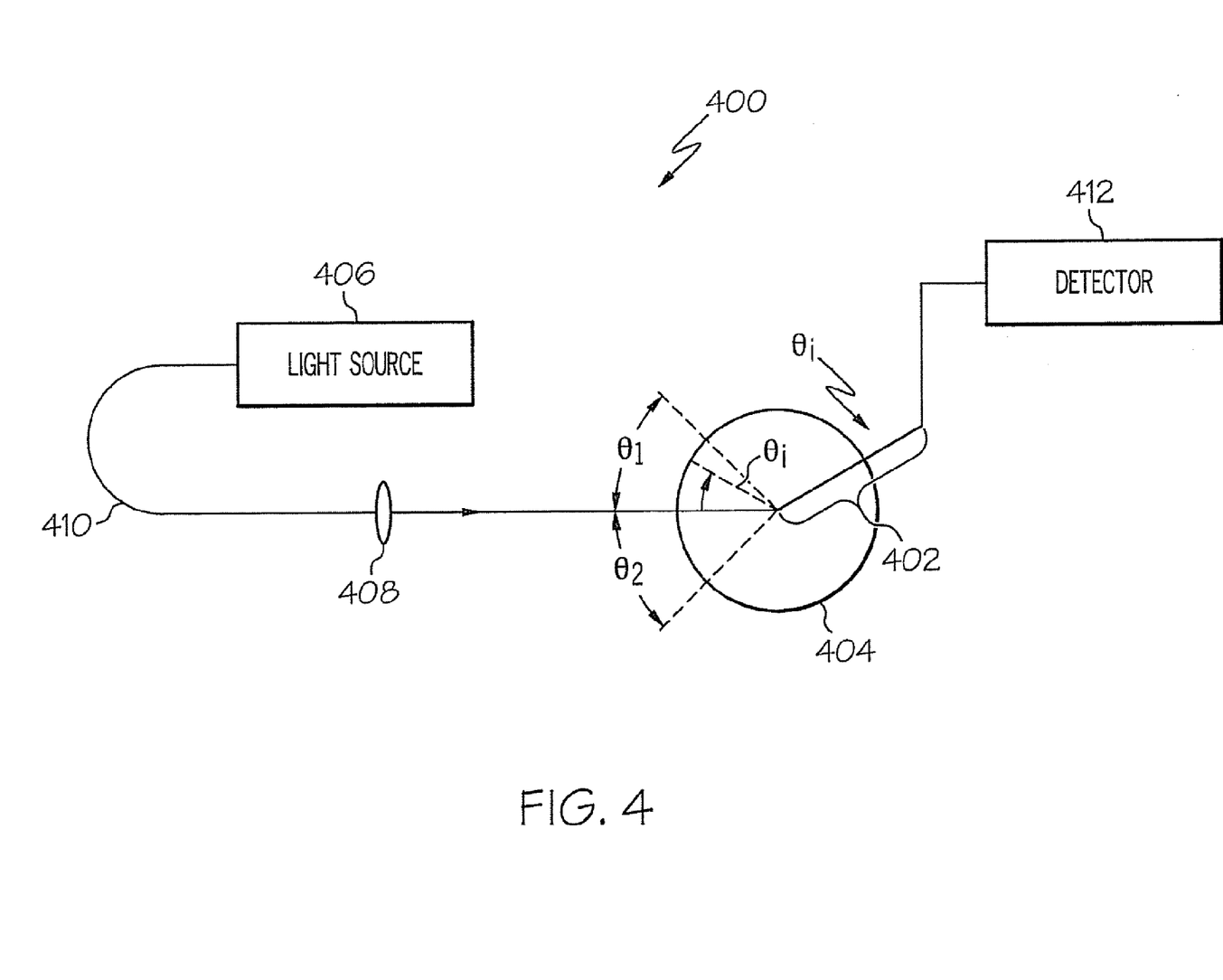
FIG. 4 illustrates a test apparatus for measuring the numerical aperture of an optical fiber.

As discussed hereinabove, the numerical aperture of the inner cladding may be mathematically calculated. However, under certain circumstances, it may be necessary to experimentally determine the numerical aperture of the inner cladding. For example, in some situations, the index of refraction of the inner cladding $n_2$ may not be precisely known. Under such circumstances the numerical aperture of the inner cladding of the double-clad optical fibers described herein may be measured using an angular measurement technique similar to that described in the article entitled "Propagation losses of pump light in rectangular double-clad fibers" by Anping Lu and Kenichi Ueda, 3134 Optical Engineering, Vol. 35 No. 11, November 1996. An exemplary device for performing a similar measurement technique is schematically shown in FIG. 4. The device generally comprises a light source 406, a rotatable stage 404 and an optical detector 412. The light source 404 may generally comprise a broadband light source with a particular center wavelength. For example, different broadband light sources may be selected to obtain different center wavelengths. Of particular interest are light sources having center wavelengths corresponding to typical operating wavelengths for the double-clad optical fibers and endoscopes employing the same. Accordingly, the broadband light source may have a center wavelength of 850 nm, 1060 nm, 1310 nm or 1550 nm.

To measure the numerical aperture of the inner cladding, the double-clad test fiber 402 is positioned on the rotatable stage 404 such that the angular orientation of the double-clad test fiber 402 may be precisely controlled with respect to the light from the light source. The output of the light source 404 is coupled into a cleaved end of the double-clad test fiber 402 with a coupling fiber 410 and a collimating lens 408. Specifically, the output of the light source 404 is coupled into the inner cladding of the double-clad test fiber 402. Light coupled into the inner cladding of the double-clad test fiber 402 is substantially collimated after passing through the collimating lens. The opposite end of the double-clad test fiber 402 is coupled to the optical detector 412 such that the power of the light coupled through the double-clad test fiber 402 may be measured.

Figure 5:
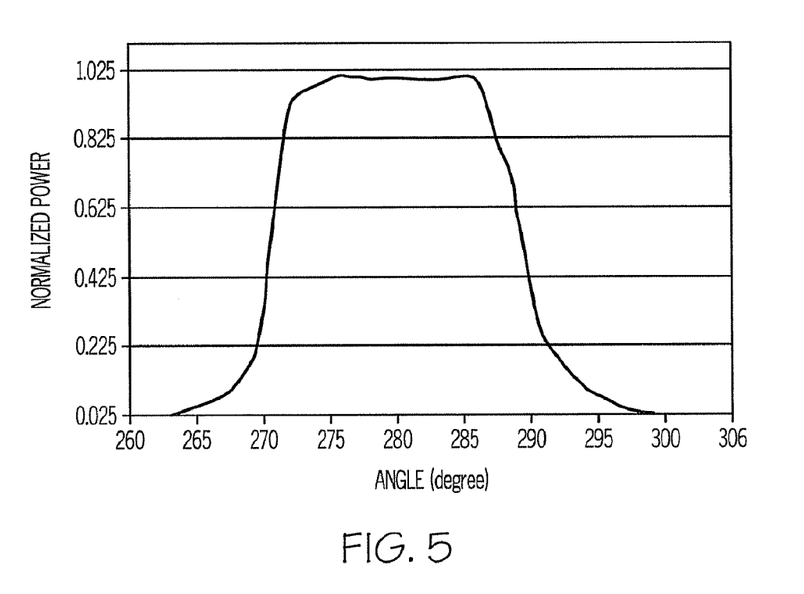
FIG. 5 is a graph showing the normalized power of a light source coupled through an optical fiber as a function of the angular orientation of the optical fiber using the test apparatus of FIG. 4.

The double-clad test fiber 402 is rotated through a range of input angles $\theta_i$ such that the angular orientation of the double-clad test fiber 402 is adjusted relative to the light from the light source 404. As the double-clad test fiber 402 is rotated, the power of the light coupled through the inner cladding of the optical test fiber 402 is measured as a function of the input angle $\theta_i$ of the light from the light source 406. An exemplary plot of the normalized power of the light coupled through the inner cladding of the double-clad optical fiber is shown in FIG. 5 as a function of the angular orientation. The numerical aperture of the inner cladding of the double-clad test fiber can be calculated for the specific wavelength of light from the light source using the half angle $$\left(e.g., \frac{|\theta_1 - \theta_2|}{2}\right).$$

In order to perform this calculation, a threshold level is set to first determine $\theta_1$ and $\theta_2$. For example, the threshold level may be set at 2.5% of the peak power of the light coupled through the inner cladding of the double-clad test fiber 402. Accordingly, $\theta_1$, and/or $\theta_2$ may be determined by rotating the double-clad test fiber 402 until the power of the light coupled through the inner cladding of the double-clad test fiber is 2.5% of the peak or maximum power coupled through the fiber. $\theta_1$ and $\theta_2$ are determined from the angular orientation of the double-clad test fiber relative to the output of the light source. For a particular threshold power level, the numerical aperture of the inner cladding may be calculated using the equation:

$$NA = \sin\left(\frac{\theta_1 - \theta_2}{2}\right)$$

The numerical aperture of the inner cladding may be measured for several different wavelengths. However, in general, the numerical aperture is only slightly dependent on the wavelength of light coupled through the optical fiber. The measurement device shown in FIG. 4 may be used in conjunction with the mathematical expression above to determine the numerical aperture of the inner cladding.

The numerical aperture of the inner claddings of the three fiber examples listed in Table 1 were experimentally determined using the above-mentioned techniques. The double-clad optical fibers were made using the outside vapor deposition (OVD) process described herein. The core of all three double-clad optical fibers comprised silica glass doped with 5.5 wt. % $GeO_2$ (no rare-earth dopants) while the inner cladding comprised pure silica glass. In these exemplary fiber embodiments the fiber core contains no rare earth dopants and no Al or F. The outer cladding comprised silica glass doped with 2 wt. % F and 5 wt. % $B_2O_3$ to lower the index of refraction of the outer cladding relative to the inner cladding. The core radius ($r_1$), inner cladding radius ($r_2$) and outer cladding radius ($r_3$) are listed for all three exemplary fibers. The numerical apertures of the double-clad optical fibers shown in Table 1 were measured to be greater than 0.25 at a 2.5% intensity threshold. The measured core fiber cutoff wavelength for all three exemplary double-clad optical fibers was below 800 nm and the core mode field diameters (MFD) are from 4.7 to 5.7 at 800 nm. The relative refractive index percent ($\Delta$%) of the core relative to the cladding (e.g., $\Delta_1$%) was determined to be 0.36%.

TABLE 1

NA Measurement results

| $r_1$ (μm) | $r_2$ (μm) | $r_3$ (μm) | $\Delta_1$% | Core fiber Cutoff (nm) | Core MFD @ 800 nm (μm) | NA of inner cladding |
|---|---|---|---|---|---|---|
| 2.55 | 57.1 | 62.54 | 0.36 | 719.8 | 4.7 | 0.263 |
| 2.65 | 61.25 | 67.6 | 0.36 | 732.7 | 5.1 | 0.283 |
| 2.96 | 67.6 | 74.7 | 0.36 | 758.6 | 5.7 | 0.305 |

Tables 2A and 2B show exemplary double-clad optical fiber compositions and the corresponding optical properties. Each exemplary composition is based on an optical fiber having a core, an inner cladding and an outer cladding all comprising silica-based glass. It is noted that preferably, as shown in Fiber examples of Tables 2A and 2B, the fiber cores include no Al, and therefore the exemplary fibers of Table 2A exhibit very low scattering loss and low attenuation of less than 1 dB/km at the operating wavelength range of 1060 nm to 1700 nm. (In a comparative fiber example with a similar refractive index profile, but with $Yb_2O_3$, $A_2O_3$ and $GeO_2$ present in the core, attenuation was greater than 20 dB/km in the wavelength ranging of 1120 nm-1700 nm, and greater than 100 dB/km below the 1100 nm wavelength).

TABLE 2A

Double-clad optical fiber exemplary compositions and properties.

| | Fiber 1 | Fiber 2 | Fiber 3 | Fiber 4 | Fiber 5 |
|---|---|---|---|---|---|
| Core dopant | 5.5% $GeO_2$ | 32.5% $GeO_2$ | 21.7% $GeO_2$ | 5.5% $GeO_2$ | 8.1% $GeO_2$ |
| Inner clad dopant | none | 27.0% $GeO_2$ | 14.1% $Al_2O_3$ | none | none |
| Outer clad dopant | 2% F, 5% $B_2O_3$ | 2% F, 5% $B_2O_3$ | 2% F, 5% $B_2O_3$ | 2% F, 5% $B_2O_3$ | 2% F, 5% $B_2O_3$ |
| $\Delta_1$% | 0.34% | 0.34% | 0.34% | 0.34% | 0.50% |
| $\Delta_2$% | 2.1% | 3.76% | 3.1% | 2.1% | 2.1% |
| Core NA | 0.12 | 0.12 | 0.12 | 0.12 | 0.15 |
| Inner clad NA | 0.30 | 0.40 | 0.36 | 0.30 | 0.30 |
| r1 (μm) | 2.50 | 2.50 | 2.50 | 2.50 | 1.98 |
| r2 (μm) | 47.5 | 47.5 | 47.5 | 110 | 47.5 |
| r3 (μm) | 62.5 | 62.5 | 62.5 | 125 | 62.5 |
| Core theoretical cutoff wavelength (nm) | 779 | 779 | 779 | 779 | 775 |
| Core MFD (μm) at 800 m | 5.5 | 5.5 | 5.5 | 5.5 | 4.5 |
| Effective Area of core (μm²) at 800 nm | 23.4 | 23.4 | 23.4 | 23.4 | 15.5 |
| Dispersion of core (ps/nm/km) at 800 m | −116 | −116 | −116 | −116 | −121 |

The silica glass based core of Fiber 1 has a radius of 2.5 μm and includes 5.5 wt. % $GeO_2$ to increase the index of refraction of the core. The core has a theoretical cutoff wavelength of 779 nm such that the core of the double-clad optical fiber is single moded at an operating wavelength of 800 nm. The inner cladding is pure silica and the relative refractive index percent ($\Delta$%) of the core relative to the inner cladding (e.g., $\Delta_1$%) is 0.34%. The outer cladding comprises silica glass doped with 2% F and 5% $B_2O_3$ to lower the refractive index of the outer cladding. The relative refractive index percent ($\Delta$%) of the inner cladding relative to the outer cladding (e.g., $\Delta_2$%)

is 2.1% which corresponds to the inner cladding having a numerical aperture of 0.3. The outer cladding has an outer radius $r_3$ of 62.5 μm such that the double-clad optical fiber is a standard 125 μm diameter optical fiber.

The numerical aperture of the inner cladding may be increased by increasing the index of refraction of the inner cladding ($n_2$) relative to the outer cladding. For instance, in Fiber 2 the inner cladding is doped with 27.0 wt. % $GeO_2$ thereby raising the index of refraction of the inner cladding. The outer cladding is doped with the same wt. % of F and $B_2O_3$ as in Fiber 1. As a result of the increased index of refraction of the inner cladding ($n_2$), the relative refractive index percent ($\Delta_2\%$) of the inner cladding relative to the outer cladding is increased to greater than about 3%, specifically 3.76%, and the numerical aperture of the inner cladding is increased to 0.4. In this example the core is doped with additional $GeO_2$ to maintain $\Delta_1\%$ at 0.34% as in Fiber 1.

Alternatively, the inner cladding may comprise other dopants which may increase the index of refraction of the inner cladding. For instance, in Fiber 3 the inner cladding comprises 14.1% $Al_2O_3$ which has the effect of increasing the index of refraction of the inner cladding ($n_2$), raising the relative refractive index percent ($\Delta_2\%$) of the inner cladding relative to the outer cladding to greater than about 3%, specifically 3.1% and raising the numerical aperture of the inner cladding to 0.36. As with Fiber 2, the core is doped with sufficient $GeO_2$ to maintain $\Delta_1\%$ at 0.34%.

The exemplary compositions in Fibers 1-3 are directed to double-clad optical fibers wherein the radius of the outer cladding ($r_3$) is 62.5 μm. However, for some applications larger diameter fibers may be needed to further improve the collection efficiency of the fiber. Accordingly, in Fiber 4 the dimensions of the double-clad optical fiber composition of Fiber 1 have been scaled up to produce an optical fiber having a 250 μm outer diameter. The numerical aperture and other properties of the larger diameter double-clad optical fiber composition of Fiber 4 are the same as those of the double-clad optical fiber composition of Fiber 1.

In the exemplary compositions of Fibers 1-4 the core of the double-clad optical fiber has a numerical aperture of 0.12 and a mode field diameter (MFD) of 5.5 μm. However, for some applications a core with a higher numerical aperture and a smaller MFD may be desirable. This may be accomplished by increasing the index of refraction of the core through doping. In Fiber 5 the core is doped with 8.1 wt. % $GeO_2$ (compared to the 5.5 wt. % $GeO_2$ of Fiber 1). Compared to Fiber 1, the additional $GeO_2$ in Fiber 5 increases $\Delta_1\%$ of the fiber to 0.50% and increases the numerical aperture of the core to 0.15 while decreasing the MFD to 4.5 μm.

In the exemplary compositions of Table 1A the double-clad optical fibers are designed for an operating wavelength of 800 nm. However, as shown in Table 1A, the dispersion of the core of the double-clad optical fibers at 800 nm are on the order of −120 ps/nm/km at 800 nm. In order to reduce the dispersion of the core, different operating wavelengths may be used. Such operating wavelengths may generally correspond to other operating wavelengths commonly used in endoscopy. For example, nonlinear optical endoscopes may have operating wavelengths in the range of 800 to 1550 nm. The double-clad optical fiber in Fibers 6-10 shown in Table 2B are designed for operating wavelengths other than 800 nm, specifically 1060 nm, 1310 nm and 1550 nm.

TABLE 2B

Double-clad optical fiber exemplary compositions and properties

|  | Fiber 6 | Fiber 7 | Fiber 8 | Fiber 9 | Fiber 10 |
| --- | --- | --- | --- | --- | --- |
| Core dopant | 5.5% $GeO_2$ | 5.5% $GeO_2$ | 19.5% $GeO_2$ | 5.5% $GeO_2$ | 5.5% $GeO_2$ |
| Inner clad dopant | none | none | none | none | none |
| Outer clad dopant | 2% F, 5% $B_2O_3$ | 2% F, 5% $B_2O_3$ | 2% F, 5% $B_2O_3$ | 25% air fill | 90% air fill |
| $\Delta_1\%$ | 0.34% | 0.34% | 1.2% | 0.34% | 0.34% |
| $\Delta_2\%$ | 2.1% | 2.1% | 3.1% | 11.7% | 30% |
| Core NA | 0.12 | 0.12 | 0.22 | 0.12 | 0.12 |
| Inner clad NA | 0.30 | 0.30 | 0.36 | 0.68 | 1 |
| r1 (μm) | 3.22 | 4.01 | 2.28 | 4.01 | 4.01 |
| r2 (μm) | 47.5 | 47.5 | 47.5 | 47.5 | 47.5 |
| r3 (μm) | 62.5 | 62.5 | 62.5 | 62.5 | 62.5 |
| Core theoretical cutoff wavelength (nm) | 1021 | 1295 | 1240 | 1295 | 1295 |
| Core MFD (μm) | 7.28 (at 1060 nm) | 9.09 (at 1310 nm) | 5.44 (at 1550 nm) | 9.09 (at 1310 nm) | 9.09 (at 1310 nm) |
| Effective Area of core (μm²) | 41.7 (at 1060 nm) | 65.2 (at 1310 nm) | 22.4 (at 1550 nm) | 65.2 (at 1310 nm) | 65.2 (at 1310 nm) |
| Dispersion of core (ps/nm/km) | −34.9 (at 1060 nm) | −0.03 (at 1310 nm) | −0.04 (at 1550 nm) | −0.03 (at 1310 nm) | −0.03 (at 1310 nm) |

For example, Fiber 6 is designed for an operating wavelength of 1060 nm. This is accomplished by increasing the radius of the core to 3.22 μm. As a result, the cutoff wavelength of the core is 1021 nm such that the double-clad optical fiber is single moded at 1060 nm. The double-clad optical fiber of Fiber 6 has an MFD of 7.28 which is greater than the MFD of fibers designed to operate at 800 nm. One particular advantage of designing the double-clad optical fiber to operate at greater wavelengths is reduced chromatic dispersion of the core of the optical fiber. For instance, the fibers of Table 2A designed to operate at 800 nm have cores with chromatic dispersions on the order of −120 ps/nm/km at 800 nm. However, Fiber 6 designed to operate at 1060 nm has a core with a chromatic dispersion of −34.9 ps/nm/km, an improvement of approximately 85 ps/nm/km over the corresponding double-clad optical fibers of Table 1A designed to operate at 800 nm.

Indeed, a core with near zero dispersion may be obtained by designing the fiber to operate at 1310 nm as shown with Fiber 7. This may be accomplished by increasing the radius $r_1$ of the core. For example, increasing the radius of the core may yield a double-clad optical fiber wherein the absolute value of the core dispersion is less than about 10 ps/nm/km, more preferably less than about 5 ps/nm/km and, most preferably, less than about 2 ps/nm/km at an operating wavelength of about 1310 nm. When the radius of the core is increased to 4.01 µm the cutoff wavelength of the core becomes 1295 and the double-clad optical fiber becomes single moded at 1310 nm. For this embodiment the chromatic dispersion of the core of the double-clad optical fiber is reduced to −0.03 ps/nm/km.

In another example, the double-clad optical fiber may be designed with nearly zero dispersion at an operating wavelength of 1550 nm by increasing $\Delta_1\%$ and decreasing the radius $r_1$ of the core. Increasing $\Delta_1\%$ and decreasing the radius of the core may yield a double-clad optical fiber wherein the absolute value of the core dispersion is less than about 10 ps/nm/km, more preferably less than about 5 ps/nm/km and, most preferably, less than about 2 ps/nm/km at an operating wavelength of about 1550 nm. For example, in Fiber 8, $\Delta_1\%$ is increased by increasing the index of refraction of the core by doping the core with 19.5 wt. % $GeO_2$. With the inner cladding comprising pure silica, $\Delta_1\%$ becomes 1.2%. The radius $r_1$ of the core is also reduced down to 2.28 µm such that the cutoff wavelength of the core is 1240 nm. As such, the double-clad optical fiber is single moded for any wavelengths above 1240 nm. For an operating wavelength of 1550 nm the dispersion of Fiber 8 is about −0.04 ps/nm/km.

As discussed hereinabove, one alternate method of increasing the numerical aperture of the inner cladding is to decrease the index of refraction of the outer cladding by forming a void-containing outer cladding with a distribution of voids throughout the outer cladding. Fibers 9 and 10 are two exemplary compositions of double-clad optical fibers having a void-containing outer cladding comprising voids.

Fiber 9 has a void-containing outer cladding comprising a distribution of small, closed voids containing trapped gas such that the regional void area of the outer cladding is about 25%. This lowers the index of refraction of the outer cladding and, as a result, the relative refractive index percent ($\Delta_2\%$) of the inner cladding to the outer cladding is increased to 11.7% and the numerical aperture of the inner cladding is increased to 0.68. Moreover, the fiber is designed to operate at a wavelength of 1310 nm (e.g., the core of the fiber has a radius $r_1$ of 4.01, the same as Example 7). As such, the double-clad optical fiber also has near-zero dispersion at the operating wavelength.

In Fiber 10 the void-containing outer cladding comprises a distribution of large, open voids containing air such that the regional void area of the outer cladding comprises 90% air. This lowers the index of refraction of the outer cladding and, as a result, the relative refractive index percent ($\Delta_2\%$) of the inner cladding relative to the outer cladding is increased to 30% and the numerical aperture of the inner cladding is increased to 1.0. As with Fiber 9, the fiber is designed to operate at a wavelength of 1310 nm such that the double-clad optical fiber has near-zero dispersion at the operating wavelength.

The exemplary fibers of Tables 2A and 2B have $GeO_2$ doped core. However other dopants can be used in the core. For example, fiber 11 in Table 2C has a silica based core doped with 4.2% $Al_2O_3$ and no other dopants (i.e., no $GeO_2$). The exemplary fiber 11 could be utilized to detect a signal in the wavelength range of 300-500 nm (due to two photon absorption), because $Al_2O_3$ doped core has less absorption and fluorescence in this wavelength range (300-500 nm), and results in lower noise background. However, $Al_2O_3$ in the core will likely to increase the linear and nonlinear fluorescence (relative to a pure silica core), thus increasing the background noise for endoscope applications. Fibers with pure silica core are attractive for lowering further the background noise. The Exemplary fiber 12 in Table 2C has a pure silica core and thus the fiber will have less background noise than the exemplary fiber 11. In exemplary fiber 12 the inner cladding is doped with F to lower its refractive index to create a waveguide in the core, and the outer cladding contains both B and F so that the outer cladding has a lower refractive index delta than the inner cladding. The two exemplary fibers (11 and 12) are designed for the operating wavelength of 800 nm and have a silica based core. Fiber 11 has attenuation of less than 5 dB at the wavelength of 800 nm. Fiber 12 has attenuation of less than 3 dB at the wavelength of 800 nm and less than 1 dB at 1060 nm. However, fibers with other operating wavelengths can also be designed using similar approaches.

TABLE 2C

Double-clad optical fiber exemplary compositions and properties

|  | Fiber 11 | Fiber 12 |
| --- | --- | --- |
| Core dopant | 4.2% $Al_2O_3$ | none |
| Inner clad dopant | none | 0.9% F |
| Outer clad dopant | 2% F, 5% $B_2O_3$ | 2% F, 5% $B_2O_3$ |
| $\Delta_1\%$ | 0.30% | 0.25% |
| $\Delta_2\%$ | 1.8% | 1.85% |
| Core NA | 0.11 | 0.10 |
| Inner clad NA | 0.27 | 0.28 |
| r1 (µm) | 2.68 | 2.95 |
| r2 (µm) | 47.5 | 47.5 |
| r3 (µm) | 62.5 | 62.5 |
| Core theoretical cutoff wavelength (nm) | 1021 | 788 |
| Core MFD (µm) | 5.82 (at 800 nm) | 6.39 (at 800 nm) |
| Effective Area of core (µm²) | 26.8 (at 800 nm) | 32.2 (at 800 nm) |
| Dispersion of core (ps/nm/km) | −115.2 (at 800 nm) | −113.6 (at 800 nm) |

Figure 6:
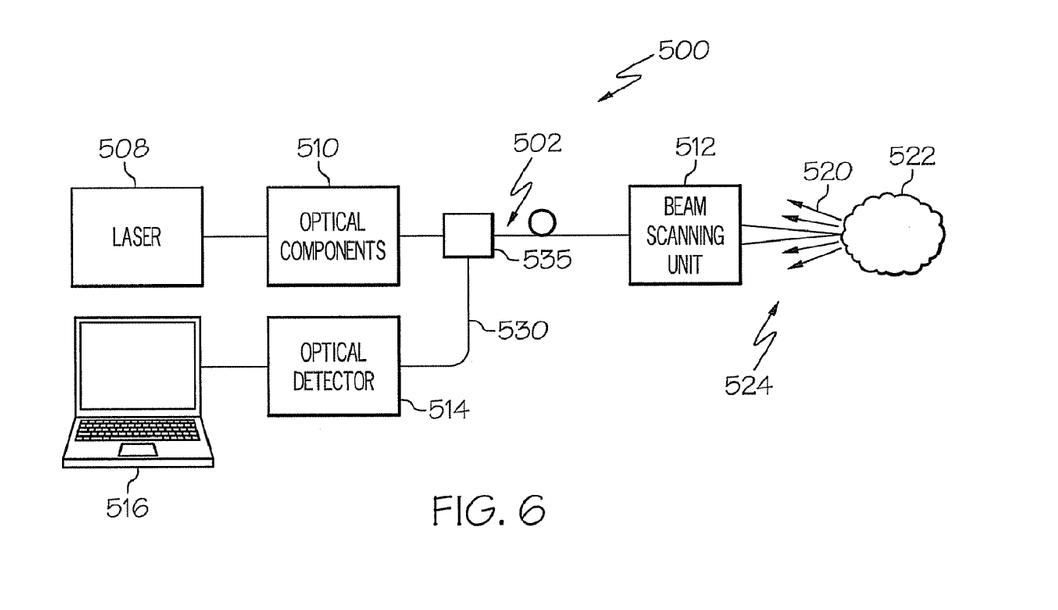
FIG. 6 is a schematic diagram of a non-linear optical endoscope device utilizing a double-clad optical fiber according to one or more embodiments shown and described herein.

Referring now to FIG. 6, a non-linear optical endoscope 500 is schematically illustrated. The relatively high numerical aperture of the inner cladding of the double-clad optical fibers shown and described herein make such fibers particularly well suited for use in conjunction with such non-linear optical endoscopes, particularly when the endoscopes use a two-photon or multi-photon fluorescence process to generate an image or spectrum from the target material. The non-linear optical endoscope 500 generally comprises a light source 508, a double-clad optical fiber 502 comprising a core 504, an inner cladding 506 and an outer cladding as described herein, a beam scanning unit 512 and an optical detector 514.

The light source 508 may comprise a laser source such as a short-pulse laser source. The output of the light source 508 may be coupled into the core of the double-clad optical fiber 502 with optical components 510 at a first end of the double-clad optical fiber. The optical components may include lenses, collimating lenses, mirrors and the like. The double-clad optical fiber may pass through an optical coupler 535 which optically couples the inner cladding of the double clad optical fiber 502 to an optical detector 514 as will be discussed further herein. A beam scanning unit 512 may be coupled to the double-clad optical fiber 502 at a second end of the double-clad optical fiber 502.

The beam scanning unit 512 may be operable to position the double-clad optical fiber 502 in two directions such that the output of the light source 508 may be scanned across a target 522. In one embodiment, the beam scanning unit 512 comprises a piezoelectric actuator which is operable to position the double-clad optical fiber 502 in two directions and thereby achieve a desired scanning pattern of the output of the light source 508 over the target 522. The non-linear optical endoscope 500 may also comprise one or more lenses (not shown) disposed in the beam scanning unit 512 such that the output of the light source exiting the double-clad optical fiber 502 passes through the lenses and is focused on the target 522. The lens may also serve to focus light emitted from the target into the inner cladding 506 of the double-clad optical fiber 502. In one embodiment, lenses for focusing the output of the light source exiting the double-clad optical fiber 502 may be disposed between the beam scanning unit 512 and the target 522.

The optical detector 514 may be optically coupled to the inner cladding of the double-clad optical fiber via the optical coupler 535 such that optical signals propagating along the inner cladding, specifically optical signals emitted from the target and collected into the inner cladding 506, are received by the optical detector. A transmission fiber 530 connects the optical coupler 535 the optical detector 514. More specifically, the optical coupler 535 couples the light propagating in the inner cladding of the double-clad optical fiber 502 to the transmission fiber 530 which transmits the light to the optical detector. In one embodiment, the optical detector responds to the optical signals propagating along the inner cladding and produces a corresponding electrical output signal to a computer 516 programmed to form an image based on the received output signal or otherwise analyze the output signal received from the optical detector. In another embodiment, the optical detector 514 may comprise a spectrometer and/or an imaging device that produces an output signal indicative of spectroscopic information derived from the optical signal propagating along the inner cladding 506. In either embodiment, the output of the optical detector may be used for determining the characteristics of the target, e.g., for creating an image of the target based upon light emitted from the target or producing a spectrogram indicative of the intensity of different wavelengths emitted from the target as a result of fluorescence processes.

In operation, the light source 508 (e.g., the laser) of the non-linear optical endoscope produces a light pulse which is coupled in to the core 504 of the double-clad optical fiber 502 using the optical elements 504. The light pulse is propagated along the double-clad optical fiber 502 and exits the second end of the double-clad optical fiber proximate the beam scanning unit 512. The beam scanning unit 512 may be used to position the double-clad optical fiber 502 such that the light pulse exiting the double-clad optical fiber is scanned along the target 522. When a light pulse exits the double-clad optical fiber and is incident on the target, the target may fluoresce and emit an optical signal 520. The optical signal 520 emitted by the target 522 is collected back into the double-clad optical fiber, specifically into the inner cladding of the double-clad optical fiber 502. Due to the large numerical aperture (e.g., NA>0.25) of the inner cladding, the double-clad optical fiber is able to collect optical signals 520 with large divergence angles and, as such, improve the optical signal collection efficiency of the double-clad optical fiber.

After the optical signal 520 emitted by the target is collected into the inner cladding, the optical signal is propagated back along the double-clad optical fiber 502 in the inner cladding where it is diverted to the optical detector 514 by the optical coupler 535 with the transmission fiber 530. The optical detector 514 converts the optical signal 520 into an electronic signal which may be used to further analyze and/or image the target.

It should now be understood that the various embodiments and compositions of double-clad optical fibers shown and described herein may yield double-clad optical fibers having numerical apertures greater than about 0.25. Moreover, certain embodiments and compositions of double-clad optical fibers shown and described herein may yield double-clad optical fibers having low chromatic dispersion in addition to having numerical apertures greater than about 0.25.

It should also be understood that the optical properties of the double-clad optical fibers shown and described herein, specifically the large numerical aperture of the inner cladding of the double-clad optical fibers, make the double-clad optical properties well suited for incorporation into optical endoscopes, particularly non-linear optical endoscopes which utilize a two photon or multi-photon process to image and/or analyze a target. In particular, the use of double-clad optical fibers as shown and described herein may improve the optical signal collection efficiency of non-linear optical endoscopes and, as a result, improve the quality of images produced by the non-linear optical endoscopes as well as the quality of data derived from the optical signals collected by the non-linear optical endoscopes.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A double-clad optical fiber comprising a core, an inner cladding and an outer cladding wherein:
    the core comprises a radius of less than about 5 µm, a first index of refraction $n_1$ and does not contain any active rare-earth dopants;
    the inner cladding surrounds the core and comprises a radial thickness of at least 25 µm, a numerical aperture of at least about 0.25, and a second index of refraction $n_2$ such that $n_2<n_1$, wherein a relative refractive index percent (Δ%) of the core relative to the inner cladding is greater than about 0.1%;
    the outer cladding surrounds the inner cladding and comprises a radial thickness from about 10 µm to about 50 µm and a third index of refraction $n_3$ such that $n_3<n_2$, wherein a relative refractive index percent (Δ%) of the inner cladding relative to the outer cladding is greater than about 1.5%; and
    the core, the inner cladding and the outer cladding are formed from silica-based glass, wherein said fiber has attenuation of less than 1 dB/km at the wavelength range of 1060 to 1700 nm.

2. The double-clad optical fiber of claim 1 wherein the numerical aperture of the core is from about 0.08 to about 0.2.

3. The double-clad optical fiber according to claim 1 wherein the inner cladding comprises pure silica glass and the core comprises from about 5.5 wt. % $GeO_2$ to about 32.5 wt. % $GeO_2$.

4. The double-clad optical fiber according to claim 1, wherein the inner cladding comprises pure silica glass and the outer cladding is co-doped with boron and fluorine.

5. The double-clad optical fiber of claim 4 wherein the outer cladding comprises less than about 5.0 wt. % fluorine and less than about 10 wt. % boron in the form of $B_2O_3$.

6. The double-clad optical fiber of claims 1 wherein:
    the inner cladding comprises a dopant such that the relative refractive index percent (Δ%) of the inner cladding to the outer cladding is greater than about 3%;
    the core comprises a dopant such that the relative refractive index percent (Δ%) of the core relative to the inner cladding is greater than about 0.3%; and the outer cladding comprises less than about 5.0 wt. % fluorine and less than about 10 wt. % boron in the form of $B_2O_3$.

7. The double-clad optical fiber of claim 6 wherein the inner cladding comprises from about 5.5 wt. % to about 27 wt. % $GeO_2$.

8. The double-clad optical fiber of claim 6 wherein the inner cladding comprises from about 1 wt. % to about 15 wt. % $Al_2O_3$.

9. The double-clad optical fiber according to claim 1, wherein the outer cladding comprises a distribution of voids which decrease the index of refraction of the outer cladding $n_3$ relative to the index of refraction of the inner cladding $n_2$.

10. The double-clad optical fiber of claim 9 wherein the voids are non-periodically distributed throughout the outer cladding.

11. The double-clad optical fiber of claim 9 wherein the voids are periodically distributed throughout the outer cladding.

12. The double-clad optical fiber of claim 9 wherein the voids comprise different cross sectional areas.

13. The double-clad optical fiber of claim 9 wherein the voids are less than about 500 nm in diameter and the regional void area percent of the outer cladding is from about 10% to about 30%.

14. The double-clad optical fiber of claim 13 wherein the voids are closed and comprise nitrogen, krypton or combinations thereof.

15. The double-clad optical fiber of claim 9 wherein the voids are open.

16. The double-clad optical fiber of claim 15 wherein the voids are greater than about 1 µm in diameter and the regional void area percent of the outer cladding is from about 80% to about 95%.

17. The double-clad optical fiber of claim 9 wherein the inner cladding comprises pure silica glass and the core comprises from about 5.5 wt. % to about 27 wt. % $GeO_2$.

18. The double-clad optical fiber according to claim 1, wherein the absolute value of the chromatic dispersion of the core is less than about 10 ps/nm/km for an operating wavelength of about 1550 nm.

19. The double-clad optical fiber of claim 1 wherein the absolute value of the chromatic dispersion of the core is less than about 10 ps/nm/km for an operating wavelength of about 1310 nm.

20. An optical endoscope comprising a laser source, a double-clad optical fiber, a beam scanning unit, an optical detector and a computer, wherein:
the double-clad optical fiber comprises a core, an inner cladding and an outer cladding wherein:
wherein said fiber has attenuation of less than 1 dB/km at the wavelength range of 1060 to 1700 nm
the core comprises a radius of less than about 5 µm, a first index of refraction $n_1$ and does not contain any active rare-earth dopants;
the inner cladding surrounds the core and comprises a radial thickness of at least 25 µm, a numerical aperture of at least about 0.25, and a second index of refraction $n_2$ such that $n_2<n_1$, wherein a relative refractive index percent ($\Delta$%) of the core relative to the inner cladding is greater than about 0.1%;
the outer cladding surrounds the inner cladding and comprises a radial thickness from about 10 µm to about 50 µm and a third index of refraction $n_3$ such that $n_3<n_2$, wherein a relative refractive index percent ($\Delta$%) of the inner cladding relative to the outer cladding is greater than about 1.5%; and
the core, the inner cladding and the outer cladding are formed from silica-based glass;
an output of the laser source is optically coupled to the core of the double-clad optical fiber at a first end of the double-clad optical fiber such that the output of the laser source is directed into the core of the double-clad optical fiber;
the optical detector is coupled to the inner cladding of the optical fiber at the first end of the double-clad optical fiber and is operable to convert light traveling through the inner cladding into electrical signals;
the computer is electrically coupled to the optical detector and operable to form an image from electrical signals received by the optical detector; and
the beam scanning unit is optically coupled to a second end of the optical fiber, wherein the beam scanning unit is operable to scan the output of the laser source directed into the core of the double-clad optical fiber across a target in two dimensions and collect light emitted from the target into the inner cladding of the optical fiber.

21. The double-clad optical fiber according to claim 1, wherein said core has more $GeO_2$ than said inner cladding.

22. The double-clad optical fiber according claims 1, wherein said core has at least 5 wt % more $GeO_2$ than said inner cladding.

23. The double-clad optical fiber according to claim 1, wherein the effective area of the core is $\leq 65.2$ µm².

24. The double-clad optical fiber according to claim 1, wherein the outer radius of said inner cladding is $\leq 61.25$ µm.

25. The double-clad according to claim 1, wherein said core is a single mode core at the operating wavelength.

26. The double-clad optical fiber according to claim 1, wherein said fiber has a cut-off wavelength of not longer than 800 nm.

27. The double-clad optical fiber according to claim 1, wherein said core has no Al.

28. The double-clad optical fiber according to claim 1, wherein the core comprises $GeO_2$, and the inner cladding has no $GeO_2$.

29. The double-clad optical fiber according to according to claim 1, wherein the core is pure silica without any other dopants.

30. The double-clad optical fiber according to claim 1, wherein the inner cladding does not include Ge.

* * * * *